Patented Aug. 14, 1951

2,564,124

UNITED STATES PATENT OFFICE 2,564,124

BREAD STALING

Frederick W. Miller, Jr., and Robert D. Kralovec, Wilmington, Del., assignors to E. I. du Pont de Nemours & Company, Wilmington, Del., a corporation of Delaware No Drawing. Application August 4, 1947,
Serial No. 766,088

2 Claims. (Cl. 99—90)

This invention relates to a process for extending the useful life of baked goods, and more particularly to compounds for use in bread to fortify it against staling.

"Staling" is commonly considered as including chemical and/or physical changes which occur in the finished loaf of bread on storage, under normal conditions, until consumed. This may be divided into the staling of the crust and staling of the crumb.

The processes involved in the staling of the crust are quite different from those of the crumb and are probably much less complex. The dry, crisp crust of fresh bread becomes soft and leathery as the bread stales. This is due inter alia, to absorption of moisture by the crust from the center of the loaf (crumb) and from the atmosphere surrounding the loaf if the humidity is high. The modern tendency of wrapping bread in moistureproof paper increases the rate of staling of the crust by almost entirely preventing the evaporation of moisture absorbed from the crumb.

The staling of the crumb is a much more complex process. The crumb first becomes tougher and harder, then becomes crumbly and finally after a much longer time, dries out. The changes of becoming hard and crumbly occur before the crumb has lost most of its water content. Loss of water, however, does not necessarily precede staling.

Both processes of staling are accomplished by losses of flavor, aroma and freshness and as a consequence bread rapidly loses its value if not sold within a short period of time after baking. Although the baker has fulfilled part of his obligation by selling a fresh loaf that retains its initial freshness for a reasonable period after it gets in the hands of the ultimate customer, his efforts should not stop there but extend to maintenance of that freshness for an extended period after the bread reaches the customer.

An object of the present invention is to provide a process for improving the texture of bread and baked doughs, and extending the useful life of breads, cakes and similar baked goods. Another object of the invention is to provide freshness extenders that will retard bread staling. A still further object of the invention is to provide freshness extenders for bread, which when incorporated in ferment-raised doughs will increase the time the baked product remains fresh. Other objects and advantages of the invention will hereinafter appear.

The above and other objects of the invention are realized by incorporating into a dough prior or subsequent to its raising by fermentation, or a batter prior to $CO_2$ evolution, from 0.1 to 4% and preferably from 0.5 to 2% of a freshness extender based on the weight of the baked product. These freshness extenders are esters of the long-chain fatty acids containing more than 13 carbon atoms and preferably from 14 to 20 carbon atoms that include the esters of the saturated acids, e. g., pentadecanoic, palmitic, margaric, stearic, nondecylic, and arachidic; the esters of the unsaturated acids, e. g. hypogaeic, oleic, elaidic, erucic, brassidic and linoleic; and the esters of the hydroxylated unsaturated acids, e. g., ricinoleic and ketohydroxystearic. Not all esters of such acids have been found suitable, but only the polyethylene glycol and polyglycerol esters.

The monocarboxylic acid esters of polyglycerol or its analogues are prepared by heating at least two mols of the same or different polyhydric alcohols with one mole of a carboxylic acid or one of its esters in the presence of a small amount of alkali reacting substance—C.A.27, 4814 (1933), while polyhydric alcohol esters generally may be prepared by the process of U. S. 2,069,336, February 2, 1937, O. Schmidt and E. Meyer, wherein ethers obtained from polyhydric alcohols, e. g., ethylene glycol, are reacted with halogenated paraffins, hydroxyparaffins, olefins, carboxylic acids, etc.

The aforesaid freshness extenders may be added to dough in any suitable manner. For example, they may be thoroughly mixed with the flour prior to the preparation of the dough, mixed with the shortening used prior to its addition to the bread mix, added with the salt, added directly to the dough mix during the mixing operation, or suspended in the water or milk used in preparing the dough. Subsequent to the thorough incorporation of the extenders, the normal operations employed in bread making are followed without any variations from those required when no extender is used. Similarly, in preparing cakes, cookies and the like, the freshness extenders may be introduced at any convenient time during the preparation of the batter.

The resulting baked product will have improved texture and will retain its freshness for from 1 to 3 days longer than the untreated product. Normally as one day old bread is considered technically by the baker to be stale, the surprising and unexpected advantages derived from the use of the aforesaid extender can be well appreciated by the baker, the housewife, and the consumer.

Inasmuch as staling is not susceptible of too exacting a definition, the theories advanced for its cause will aid in providing a more thorough understanding of the instant invention. The theory generally accepted, which of course will not limit in any way the scope of the instant invention, is that bread staling is due to a change in the distribution of moisture between the starch and gluten; the change in the texture in the loaf is due to a change in the starch. The gluten in the crumb is dehydrated to a certain extent by the baking process. This moisture is taken up by the starch, which is gelatinized in baking and contains its maximum of moisture when the loaf comes out of the oven. After standing, some of the moisture passes out of the gelatinized starch and is absorbed by the coagulated gluten. The result of this migration of moisture from the starch to the gluten of the loaf leaves the starch dry and stiffened. As a consequence the texture of the bread becomes at first tough, then later crumbly and harsh as the bread stales. Heating the bread tends to reverse this process and the use of the extenders appears to retard the process.

To illustrate the effectiveness of the staling inhibitors this bread formula was employed:

Formula

|  | Percent |
|---|---|
| Flour | 100 |
| Water (21° C.) | 65 |
| Yeast | 4 |
| Yeast food | 4 |
| Powdered skim milk | 4 |
| Sugar | 6 |
| Salt | 2 |
| Shortening | 4 |

Method

1. Mix all ingredients 7 min.
2. Ferment for 1.5 hr. at 85° F.
3. Mix again 5 min.
4. Let dough stand 20 min. at 80° F.
5. Divide and round.
6. Let rounded dough stand 10 min. at 80° F.
7. Mold.
8. Proof 60 min. at 98° F.
9. Bake 25 min. at 450° F.
10. Cool 60 to 75 min.

In the above formula the amount of flour is taken as 100 percent and the percent of the other ingredients is calculated on this basis. In testing the compounds the percent added is calculated on the basis of the final weight of the bread which is approximately 90% of the weight of the ingredients used.

In the table the freshness extender was added directly to the dough during the mixing and kneading operation.

Bread Staling Inhibition Obtained With Surface Active Agents

| Extenders Used | Compressometer Readings (¹) | | | | | Freshness [2] Extension | |
|---|---|---|---|---|---|---|---|
|  | 1 day | 2 days | 3 days | 4 days | 5 days | 3 days | 5 days |
| 2% Nonaethyleneglycol monostearate | (7.2) | 7.8 | 8.3 | ------ | 9.9 | 2.0 | 3.6 |
| 2% Nonaethyleneglycol hexaricinoleate | (7.5) | 10.6 | 14.0 | ------ | 16.4 | 0.8 | 2.1 |
| Control | (8.0) | 13.3 | 16.8 | ------ | 19.2 | ------ | ------ |
| 2% Polyglycerol monooleate | 10.7 | ------ | 11.6 | 16.5 | ------ | 1.0 | ------ |
| Control | 9.3 | ------ | 15.2 | 20.2 | ------ | ------ | ------ |

[1] Force in grams required to depress a plate, 1.25 ins. square, a distance of 2 mm. into a uniform slice 0.5 in. in thickness. This is the average of fifteen determinations per loaf; five on each of three slices.

[2] The days of freshness extension were determined by subtracting from 3 or 5 days the period required for the control to have the same compressibility as the treated bread had after 3 or 5 days.

Staling was measured by the compressibility of the bread crumb which decreases with staling. A Baker Compressimeter was used for making the above "Compressimeter readings." Each day three slices were cut from different parts of a new loaf in a mitre box and five readings made on each slice.

At the present time breads are made commercially with a so-called low fat content 1–2% or a high fat content 2–4%. It has been found that one of the outstanding and unexpected properties of the freshness extenders of this invention is, that they will, with the low fat formula, produce a bread having the superior texture of crust and crumb of the high fat bread. The advantages of such a characteristic are apparent to those skilled in this art, giving as it does a superior product at lower fat cost.

It will be appreciated that the freshness extenders of this case may be used in batters and doughs in ways other than those described, which materials as such or in their baked form will come within the scope of the invention as claimed.

We claim:

1. A method of decreasing staling in bread which comprises incorporating in the dough, prior to baking, from 0.5 to 2% based on the weight of flour of nonaethyleneglycol monostearate.

2. A method of decreasing the staling of baked products from doughs, which comprises incorporating in a mix of the dough, prior to baking, from 0.5 to 2%, based on the weight of flour, of nonaethyleneglycol monostearate.

FREDERICK W. MILLER, Jr.
ROBERT D. KRALOVEC.

REFERENCES CITED

The following references are of record in the file of this patent:

UNITED STATES PATENTS

| Number | Name | Date |
|---|---|---|
| 2,132,397 | Coith | Oct. 11, 1938 |
| 2,132,416 | Harris | Oct. 11, 1938 |
| 2,132,417 | Harris | Oct. 11, 1938 |
| 2,132,436 | Reynolds | Oct. 11, 1938 |
| 2,132,687 | Harris | Oct. 11, 1938 |
| 2,422,486 | Johnson | June 17, 1947 |

Certificate of Correction

Patent No. 2,564,124 August 14, 1951

FREDERICK W. MILLER, JR., ET AL.

It is hereby certified that error appears in the printed specification of the above numbered patent requiring correction as follows:

Column 4, in the heading to the table, for

| Extenders Used | Compressometer Readings | | | | | (1) | Freshness ² Extension | |
|---|---|---|---|---|---|---|---|---|
| | 1 day | 2 days | 3 days | 4 days | 5 days | | 3 days | 5 days | read

| Extenders Used | Compressometer ¹ Readings | | | | | Freshness ² Extension | |
|---|---|---|---|---|---|---|---|
| | 1 day | 2 days | 3 days | 4 days | 5 days | 3 days | 5 days | and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*